United States Patent [19]

Lauchnor et al.

[11] Patent Number: 4,757,459
[45] Date of Patent: Jul. 12, 1988

[54] APPARATUS AND METHOD FOR PROGRAMMING A COMPUTER OPERATED ROBOT ARM USING MACRO INSTRUCTIONS

[75] Inventors: John C. Lauchnor; Joseph W. Schnelle, both of Cincinnati, Ohio

[73] Assignee: Cincinnati Milacron Inc., Cincinnati, Ohio

[21] Appl. No.: 868,412

[22] Filed: May 29, 1986

[51] Int. Cl.⁴ .................... G06F 15/46; G05B 19/42
[52] U.S. Cl. ................................. 364/513; 318/568; 364/193; 364/474; 901/3
[58] Field of Search .................. 364/167–171, 364/191–193, 474, 475, 513, 188, 189; 318/568; 901/2–6; 414/730

[56] References Cited

U.S. PATENT DOCUMENTS

| | | | |
|---|---|---|---|
| 3,725,652 | 4/1973 | Konvalina | 364/200 |
| 3,920,972 | 11/1975 | Corwin, Jr. | 364/513 |
| 4,146,924 | 3/1979 | Birk et al. | 364/513 |
| 4,446,525 | 5/1984 | Hoch et al. | 364/474 |
| 4,484,286 | 11/1984 | Nagamine et al. | 364/474 |
| 4,603,285 | 7/1986 | Matsoura et al. | 318/578 |
| 4,641,236 | 2/1987 | Brooks | 364/171 |

FOREIGN PATENT DOCUMENTS 0125219 11/1984 European Pat. Off. .

OTHER PUBLICATIONS

Chapter 11 of the Display Write 3 Users Guide, vol. 1, IBM—date unknown.

*Primary Examiner*—Joseph Ruggiero
*Attorney, Agent, or Firm*—Biebel, French & Nauman

[57] ABSTRACT

Apparatus and method are disclosed for teaching a cycle of operation to a computer operated robot arm. A keyboard is provided comprising first keystroke means which are operative in two different teaching modes. In a first teaching mode, the keystroke means cause storage of individual instructions defining an operation to be performed by the robot arm at a point in space. In the second teaching mode the first keystroke means are operative for creating a macro comprising a sequence of such instructions for later use. There is a pendant which controls the movement of the end of the robot arm and has second keystroke means for causing a previously stored macro to be assembled into an operating control program for the robot arm. The second keystroke means also may be used for causing assembly of individual instructions into the operating control program.

5 Claims, 5 Drawing Sheets

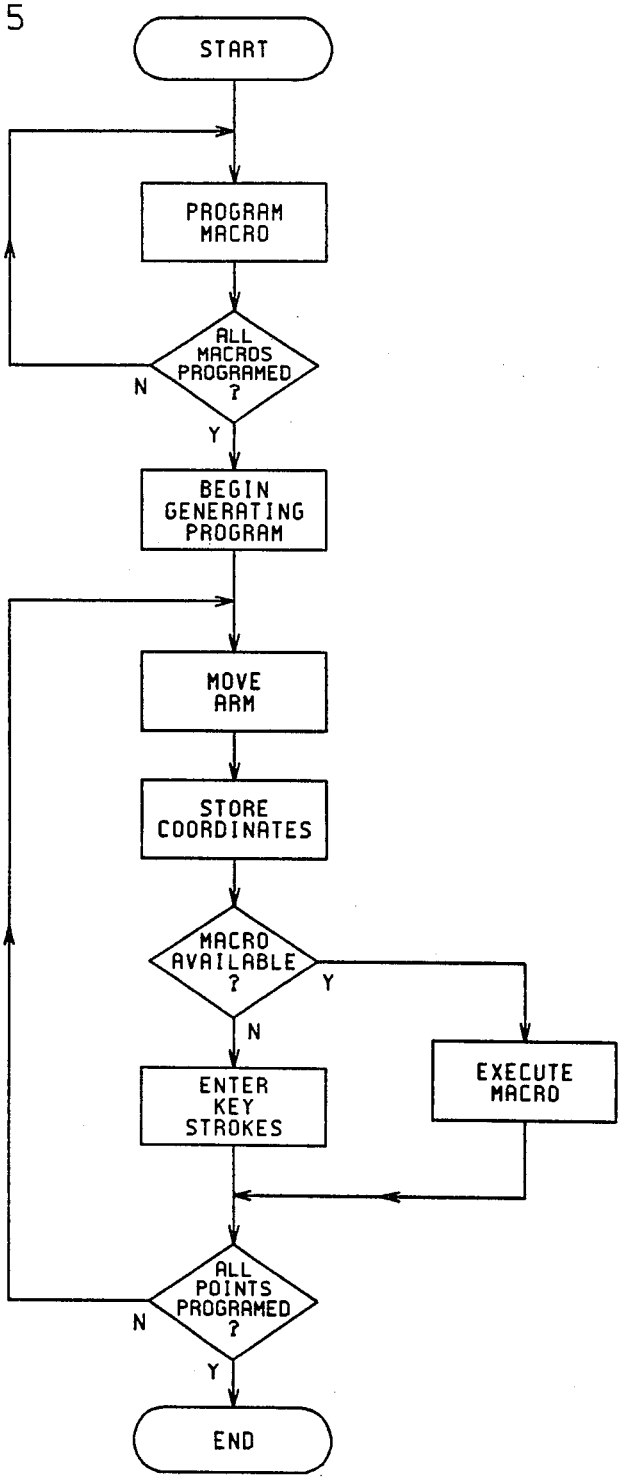

APPARATUS AND METHOD FOR PROGRAMMING A COMPUTER OPERATED ROBOT ARM USING MACRO INSTRUCTIONS

BACKGROUND OF THE INVENTION

This invention relates generally to the field of computer operated robot arms and more particularly to method and apparatus for programming a cycle of operation. The invention has particular utility in connection with programmable robot arms of the type disclosed in Corwin et al. U.S. Pat. No. 3,920,972.

In systems of the type disclosed in Corwin et al. a hand held pendant is used to cause movement of a robot arm to a series of positions within either a Cartesian or a cylindrical coordinate system. At each such position the pendant may be further used to command the end of the robot arm to assume any desired orientation. Depending upon the sophistication of the robot, as many as three positional control buttons and three orientation control buttons may be provided on the pendant. Commands from the pendant are fed into a computer to command movement of the arm by coordinate extrapolation and transformation. Such coordinate transformation is required, because the robot arm is articulated and must accomplish translational movement of the end of the robot arm by combined rotational movements of different elements of the arm.

As each new position is reached and the appropriate orientation is achieved, the pendant is operated to cause programming or teaching of a location and velocity instruction which when executed in the automatic mode of operation directs the robot arm to achieve the designated position and orientation. These instructions then become part of a cycle of operation program which controls the operation of the robot arm in the automatic mode. In general the instructions so created and stored specify the position and orientation of the end of the robot arm in the world coordinate system, that is, the combination of coordinates defining position (X, Y, Z) and orientation (D, E, R). This enables the computer to calculate a straight line path between program points.

Each time a movement instruction is created for the operating control program, the operator is given the opportunity to create programming instructions defining an operation to be performed by the robot arm. These instructions may control the arm acceleration or velocity at the designated point or may adjust a process variable, such as the voltage for a welding electrode being carried by the arm. These instructions are created by operating a keyboard incorporated within a portable teaching station which is generally a separate unit from the pendant.

The robot system as described in Corwin et al. is extremely versatile and provides the operator with a broad range of options in defining operations to be performed by the arm. However, a price is paid for this versatility in that the operator is required to enter a substantial number of keystroke instructions into the computer each time an operation is defined or modified.

It is therefore seen that there is a need to provide apparatus and method which simplifies the programming of a computer operated robot arm without compromising the versatility afforded by keystroke programming.

SUMMARY OF THE INVENTION

This invention improves keystroke programming of a computer operated robot arm by providing first keystroke means which have two modes of teaching operation. In one mode of teaching operation the first keystroke means may be operated to generate program instructions in the manner known in the prior art. In the other teaching mode the first keystroke means may be operated to create a macro comprising a sequence of instructions which are stored for later use. Macros may be defined which are used repetitively in a particular application and in general the first keystroke means are operated in this second teaching mode prior to actual generation of a cycle of operation program for the robot arm. Thereafter the robot arm may be directed to a series of predetermined points in space, at any of which the macro may be recalled from memory and assembled intact into the control program. Macro selection means are provided for recalling the macro from memory by a simple operation, as many times as may be desired. At program points requiring a particularly complex operation not previously defined by a macro, the first keystroke means may be operated in its first teaching mode for creating the instructional sequence in the known manner. In another aspect of the invention the macro selection means comprise second keystroke means mounted on a hand held pendant. These second keystroke means may recall a macro from memory and also create individual keystroke instructions.

BRIEF DESCRIPTION OF THE DRAWING

FIG. 5 is a flow diagram of steps involved in programming a robot arm.

DESCRIPTION OF THE PREFERRED EMBODIMENT

Figure 1:
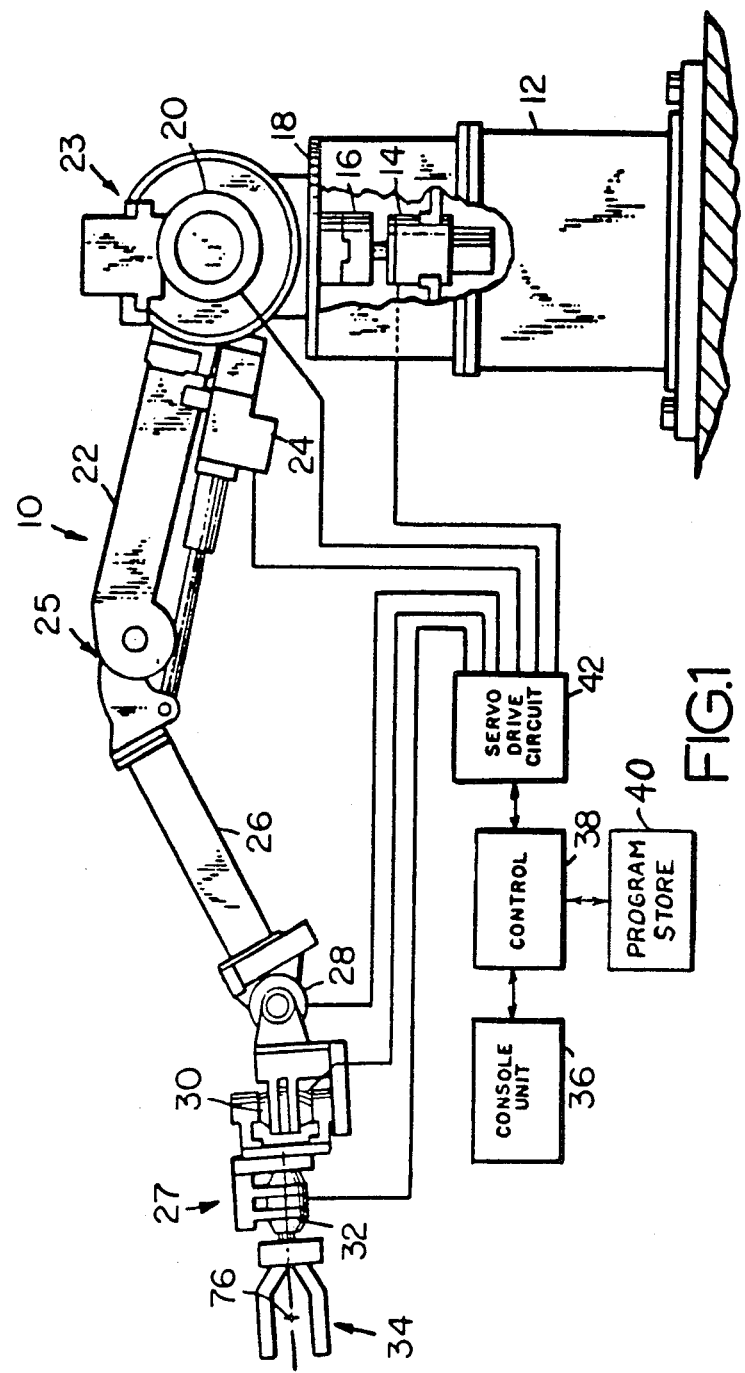
FIG. 1 is an overall view of a robot arm and illustrates its relationship to a general computer control system.

FIG. 1 illustrates the general configuration of a robot arm which may be programmed in accordance with the present invention. The illustrated robot arm 10 is comprised exclusively of axes of rotary motion. A base 12 contains an actuator 14 which is connected by means of a coupling 16 to a rotatably mounted plate 18. Rigidly fixed on the plate 18 is an actuator 20 providing a second axis of rotation. An upper arm element 22 is attached to a working member of the actuator 20 at shoulder joint 23. Affixed to upper arm element 22 is an actuator 24 which provides a rotation of a lower arm element 26 about upper arm element 22 at elbow joint 25.

Supported at the end of lower arm element 26 is a hand 27 comprising rotary actuators 28, 30 and 32 and function element 34. Function element 34 may be any of a number of different types of tooling and has a work point 76, the exact location of which is a function of the type of tooling used. For example, work point 76 may be the point at which gripper tongs come together, the point at which welding heads come together, the center of an orifice of a spray gun, etc. Practically speaking, the work point represents the end of the robot arm.

Work point 76 may be moved to any point in space within the range of robot arm 10 by operating actuators 14, 20 and 24.

The operation of robot arm 10 may also require that function element 34 be aligned or oriented at some predetermined spatial angle. Actuators 14, 20 and 24 are incapable of providing such orientation control. Actuators 28, 30 and 32 therefore provide an additional three degrees of freedom, so that robot arm 10 is able to position and orient function element 34 in any desired manner. It should be noted that function element 34 has a small actuator (not shown) for generating a desired function; e.g. a gripping action.

A console unit 36 is provided as a communication link to the robot arm. The console includes general control functions and input devices for generating input signals to enable a predetermined cycle of operation. The console further includes controls for programming or teaching the robot arm a cycle of operation. A computer 38 uses programs from a program store 40 and input signals produced by the console unit 36 to generate signals representing location and velocity therefrom and produce electrical control signals for a servo mechanism drive circuit 42. Drive circuit 42 commands the actuators on the robot arm to move the function element. In the automatic mode, the function element moves along predetermined paths consisting of a series of straight lines connecting a set of points which are specified by an operator during a teaching phase. The coordinates for such points may be established by a series of commands input into the console unit in a Cartesian coordinate system or in a cylindrical coordinate system. Computer 38 transforms those commands into appropriate electrical signals for servo drive circuit 42 in accordance with mathematical techniques which are fully described in Corwin et al. U.S. Pat. No. 3,920,972.

Figure 2:
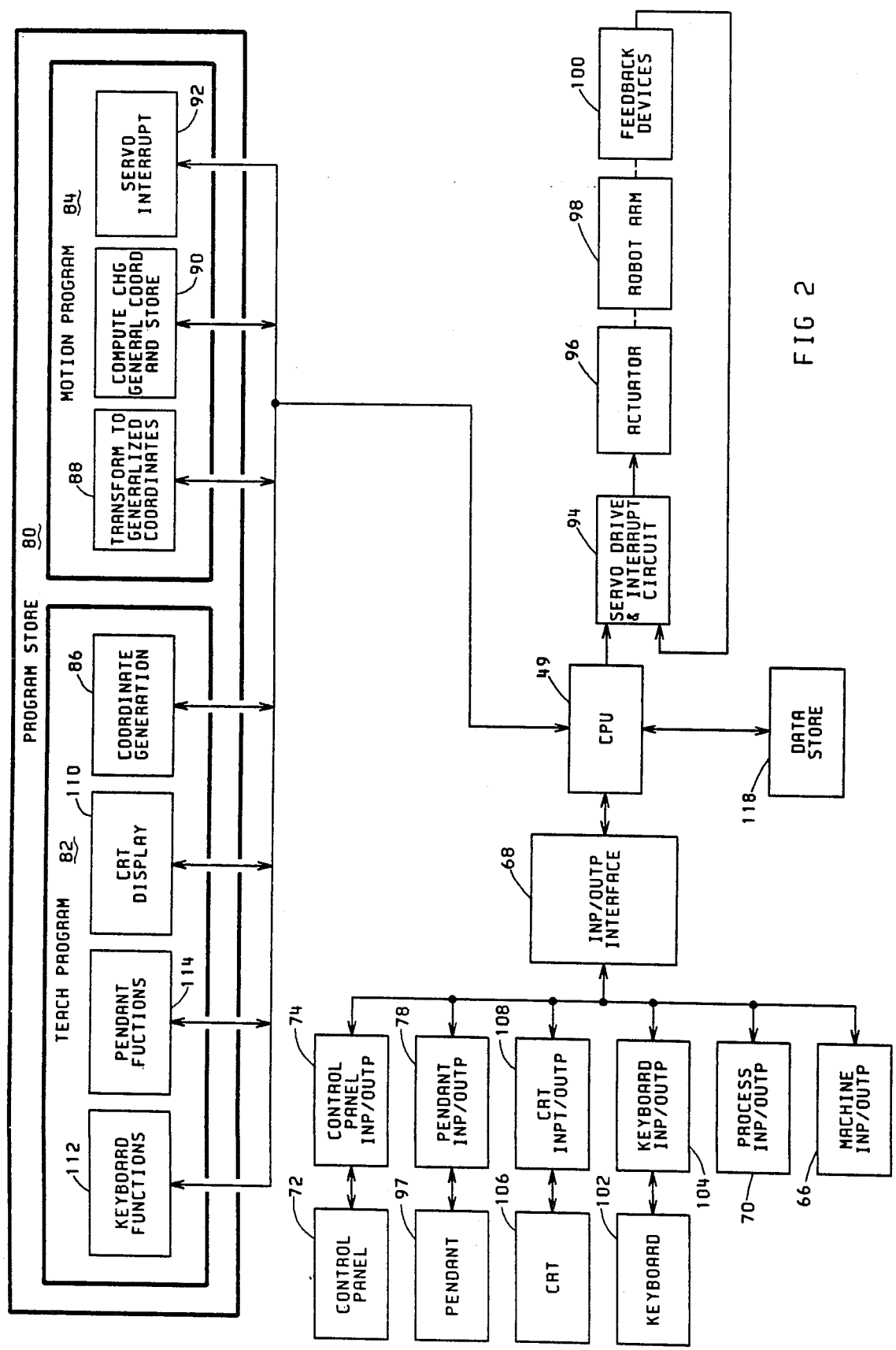
FIG. 2 is a detailed block diagram of a computer control for teaching a cycle of operation to a robot arm.

Apparatus for programming a cycle of operation is illustrated in block diagram form in FIG. 2. During the programming operation, the robot arm is located physically adjacent the physical process in which it is to be used. During the programming phase the robot arm is led through its cycle of operation by means of manual controls; and at appropriate locations, the desired functions are programmed. These appropriate locations are defined by the physical structure and relative positions of the machines and apparatus of the physical process. The locations are, in effect, predetermined by the physical environment in which the robot arm must operate.

As illustrated in FIG. 2, a machine input-output circuit 66 operates in conjunction with the CPU 49 in controlling various devices; e.g., solenoid valves, limit switches, etc. on the robot arm itself. The process input-output circuit 70 integrates the operation of the robot arm into a physical process where required by providing communication links between the robot arm and the process. A control panel 72 and its corresponding input-output circuit 74 provide general robot arm controls. The control panel provides the general power functions, a selection between the teaching and automatic modes of operation, velocity override controls, and cycle controls. After power is applied to the robot arm it is aligned to the control; and upon selecting the teach mode, the programming process may be initiated. As hereinafter described there are two different types of teach modes.

Figure 4:
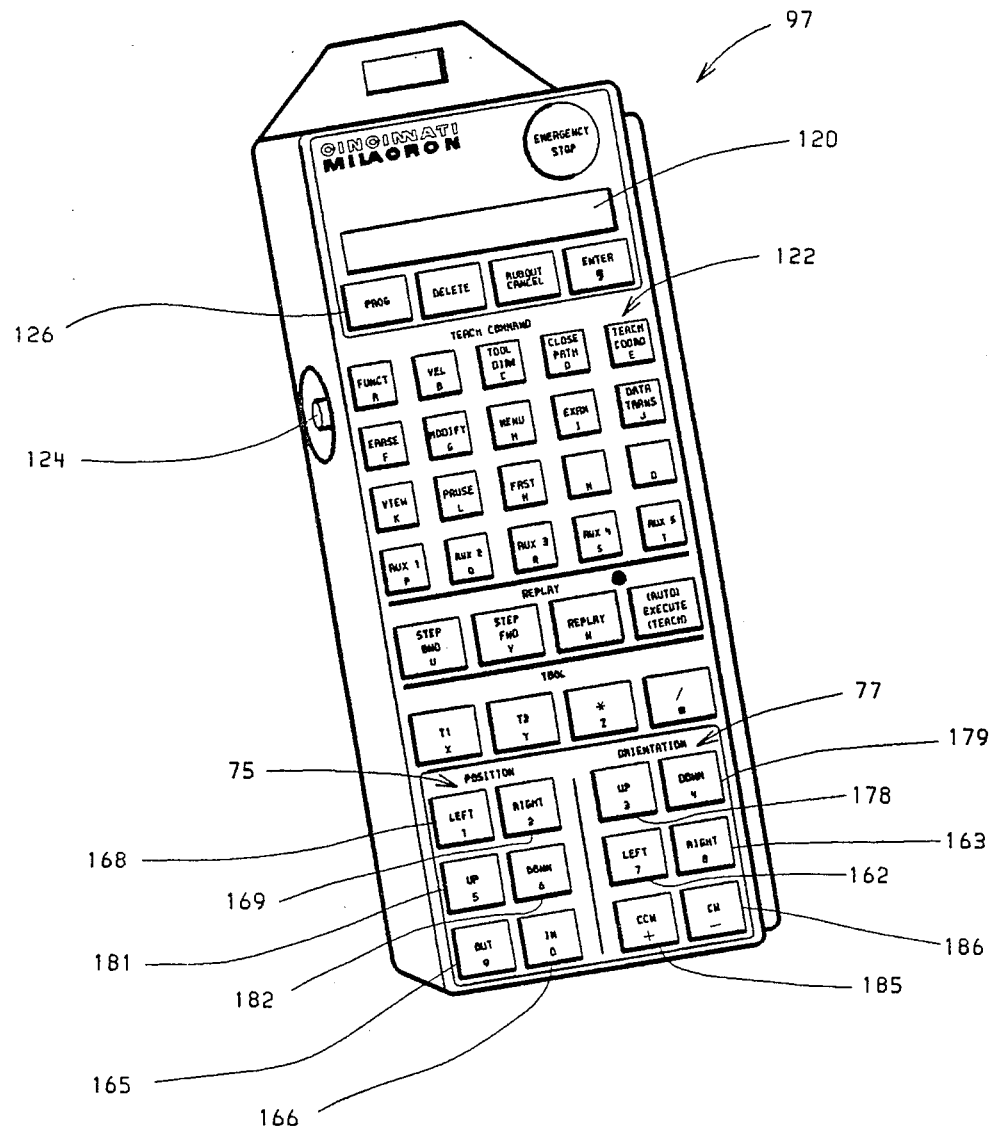
FIG. 4 is a schematic diagram of a pendant.

Information programmed into the system during the teaching modes falls into two general categories. The first category is program information relating to the position and orientation of the robot arm; and the second category relates to the functional information which integrates the operation of the robot arm into the physical process during the automatic mode. In the preferred embodiment, the position and orientation information is generated by a pendant 97 and its corresponding input-output circuit 78. Details of the pendant are illustrated in FIG. 4. That figure shows a data display 120, a set of teach keys 122 and two groups of motion control push buttons 75, 77. Push buttons 75 are operative to command changes in position, and push buttons 77 are operative to command orientation changes. As noted previously, the robot arm may be commanded to move in relation to a Cartesian coordinate system or a cylindrical coordinate system. The origin of the Cartesian coordinate system is located in the shoulder joint 23 at the intersection of the rotational axes of actuators 14 and 20.

As shown in FIG. 4, most of the pushbuttons on pendant 97 can perform two different operations. A SHIFT/HIGH SPEED key 124 controls selection of the operations. Whenever any of the dual function pushbuttons is activated together with key 124, then the upper labeled operation is performed. Otherwise, the actuation of such a pushbutton performs the lower labeled function (mostly alphanumeric characters for computer processing).

Pendant 97 is hand-held by the operator who is free to walk around the general area of the robot arm so as to have a good view of the cycle of operation. The operator may change the position of the end of the robot arm by pushing the appropriate push button 75. Assuming the Cartesian teaching coordinates are selected, the end of the robot arm may be moved in the positive direction along the Y-axis by push button 168, in the negative direction along the Y-axis by push button 169, in the positive direction along the Z-axis by push button 181, in the negative direction along the Z-axis by push button 182, in the positive direction along the X-axis by push button 165, in the negative direction along the X-axis by push button 166. In a similar manner the function element 34 may be oriented in the positive direction along the N-axis 162, in the negative direction along the N-axis by push button 163, in the positive direction along the M-axis 178, in the negative direction along the M-axis by push button 179, in the positive direction along the P-axis 185, in the negative direction along the P-axis by push button 186. These orienting motions correspond to yaw, pitch and roll, respectively, of the function element.

As shown in FIG. 2, CPU 49 operates in conjunction with a program store 80 which contains a teach program 82 and a motion program 84. Within the teach program 82 is a coordinate generation routine 86, which is responsive to the command signals produced by the activated push buttons on pendant 97, to provide sets of first signals representing rectangular coordinate values defining the desired robot arm motion. The sets of first signals produced by the coordinate generation routine are used by a transformation routine 88 in the motion program 84 to produce sets of individual control signals representing equivalent generalized coordinate values defining the machine joint angles. A routine 90 is operative to compute the necessary change in the generalized coordinates from a present position, and this change is temporarily stored. Next, a servo interrupt routine 92 is operative to transmit this change in generalized coordinate information through CPU 49 to a servo drive circuit 94. The servo drive circuit 94 produces error signals to the actuators 96 which, in turn, move the robot arm 98. Feedback devices 100 connected to the robot arm provide a closed loop feedback to the servo drive circuits 94 thereby precisely controlling the motion of the robot arm. When a desired point is reached a program push button 126, (FIG. 4) or 127 (FIG. 3) is operated, and a set of first signals representing rectangular coordinate values of the desired point are transferred to and stored in a data store 118 effectively "teaching" the point.

After the operator has moved the function element to a desired point, certain other information may be programmed. The programming of this information may be accomplished through use of a portable teaching station including a keyboard 102 with its associated input-output circuit 104. For the convenience of the operator, a CRT display 106 and the corresponding input-output circuit 108 is provided. As an alternative, such programming may be accomplished through use of teach keys 122 of pendant 97. The only difference is that certain keystrokes on pendant 97 may require cooperative actuation of one of teach keys 122 and also SHIFT-/HIGH SPEED key 124. Details of keyboard 102 are illustrated in FIG. 3, from which it will be noted that there is no key corresponding to key 124 of pendant 97.

Figure 3:
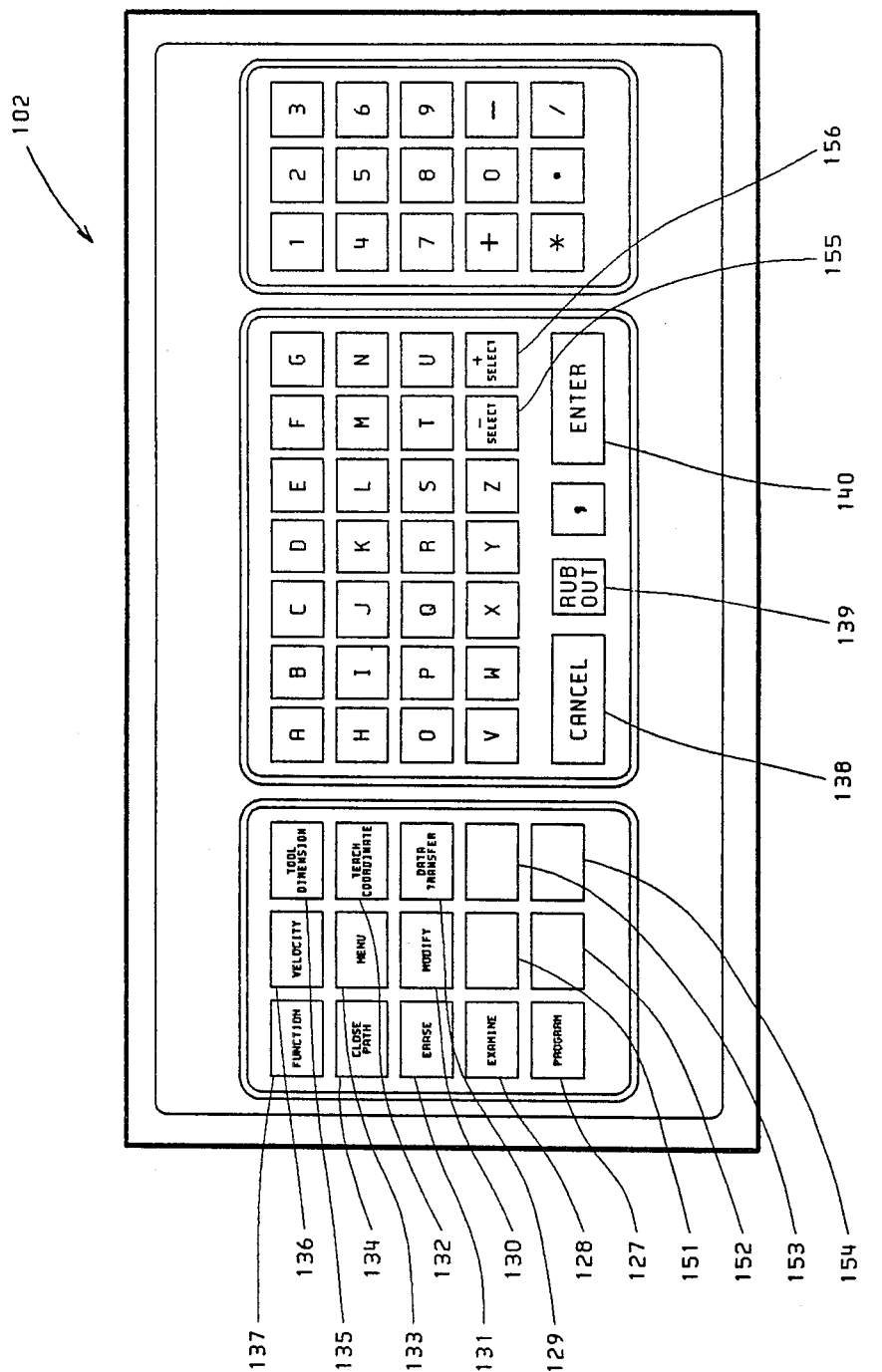
FIG. 3 is a schematic diagram of a keyboard for a portable teach station.

Referring now to FIG. 3, it will be seen that keyboard 102 has a series of pushbuttons arranged in three panels. They include a series of alphanumeric keys and fourteen special operation keys 127 through 140, all of which have functional counterparts on pendant 97. These keys all have the functional capability of operating in a first teaching mode in which they generate keystroke instructions for an operating control program. Such instructions are generated in association with robot arm movement, as described above. Such instructions are generated in accordance with a programming language popularized by Cincinnati Milacron Inc. and known in the trade as T$^3$. Manuals for programming in that language are available from Cincinnati Milacron Inc. and therefore an explanation of the instruction set is not included herein.

Keyboard 102 also has the capability of operating in a second teach mode wherein its alphanumeric keys and its special operation keys 127 through 140 are operated without any associated teaching movement of robot arm 10. Instead, the keys are used to generate macros which are stored for later selection as part of an actual teaching sequence. This reduces the number of keystrokes required for teaching a robot and greatly simplifies the teaching process. Once the macros have been defined and stored, an operator may use pendant 97, as described above, to teach a series of spatial coordinates and specify operations to be performed at those coordinates by merely pressing an alphanumeric key labeled with the name of a macro defining a desired operation. The selected macros are then assembled into the cycle of operation program by well known computer programming techniques.

A keyboard 102, as illustrated in FIG. 3, may be put into the macro teaching mode by typing the phrase EXAMINE, MACROS. Thereafter, the operator defines a macro by typing a phrase such as, "A =[FU]PE, 254 [EN][PR]" wherein the brackets designate special function keys identified in Table I. This is an instruction which will be recognized by persons familiar with the T$^3$ programming language as a direction calling for the robot to perform sequence 254. Teaching of the macro is completed by actuation of a "soft" key defined as MACRO ENTER when teaching macros. Thereafter, during robot programming, the operator may teach the robot to perform sequence 254 by simply pressing the alphanumeric key "A". Thus, a single keystroke teaches an instruction requiring nine keystrokes in the prior art. Macro "A" may be called as many times as desired during a programming operation. Alternatively, pendant 97 may be operated to teach such an instruction by the conventional nine-keystroke sequence (keeping in mind that key 124 must be operated for enabling the "[FU]" and "[EN]" keystrokes) or to load a macro created at the portable teach station. Reference may be made to Table I for a listing of the programming abbreviations associated with the special operation keys on pendant 97. The same definitions are applicable for keyboard 102.

TABLE I

[FU]—FUNCTION
[VE]—VELOCITY
[TD]—TOOL DIMENSION
[CP]—CLOSE PATH
[ME]—MENU
[TC]—TEACH COORDINATE
[ER]—ERASE
[MO]—MODIFY
[DT]—DATA TRANSFER
[EX]—EXAMINE
[PR]—PROGRAM
[VW]—VIEW
[EN]—ENTER
[CA]—CANCEL

Keyboard 102 also has four "soft" keys 151 through 154 which may be programmed to designate different commands associated with the definition of a macro. Five different commands may be associated with each of the soft keys, and cyclical selection of different command sets may be made by operating keys 155, 156. Table II lists some typical macro commands which may be selected from the soft keys. In each case a brief description of the command is given.

TABLE II

[IN]
Input —Allows the operator to enter data when the macro is executing ("expanding").
[MV]
Move —Allows the operator to move the robot arm via the pendant at a specified point in the expansion of the macro.
[TA]
Task —Executes the function(s) of a point or sequence.
[D−]
Display OFF —Suppresses display of normal system messages to the teach pendant or portable teach station during macro execution.
[D+]
Display ON —Turns the displays back on.
[MS]
Message —Allows the operator to specify a message to be printed during macro expansion.
[DA]
Data Macro —Designates which macro will be used as the data macro.
[RD]

Read from Data Macro —This command reads the next element of data from the data macro.

By way of example, the "[IN]" command may be used in a macro of the following type:

PE =[FU] PE, [IN][PR]

When this macro is executed during robot programming (by actuating the keys "P" and "E"), a question mark and a flashing cursor will appear on the data display of the device being used, either the pendant display 120 or the CRT 106 of the portable teach station. This indicates that operator input information is required. The operator may respond, for instance, by actuating pendant 97 to input the numbers "2", "5" and "4", followed by operation of the "ENTER" key. This would result in teaching the robot to perform sequence 254, so that the taught program would include the same instruction steps as would be programmed by selection of the above discussed macro "A".

As another example, assume that the acceleration of the robot arm is controlled by a variable in the computer memory identified as variable number 20. The robot then might be taught to modify its acceleration at a taught point by executing the macro:

A =[EX] VA, 20 [EN][MS] ACC =[EN][IN][CA]

wherein VA represents "variable". Execution of this macro causes the display 120 to print "ACC =", followed by a blinking cursor and "?". The operator responds by typing in a new acceleration rate such as, for instance, 15. This then causes the following instruction to be taught to the robot:

[EX] VA, 20 [EN]15 [CA]

Yet another macro might be defined as follows:

VE =[VE]1,3 [EN]2,6 [EN]3,9 [EN][CA] Persons knowledgable in the T$^3$ programming language will understand that the above macro teaches an instruction which sets the first three entries in the robot's velocity table to 3, 6 and 9 respectively.

It will be appreciated that a robot may be customized for many different specialized operations by defining associated customized macro sets. Usage of such macros may be facilitated by providing clear plastic overlays for pendant 97. Such overlays may contain descriptive terms for the macros which may be called by the different keys.

FIG. 5 presents a flow chart for robot teaching in accordance with this invention. As shown therein, a robot is initially customized by defining appropriate macros. Thereafter, the robot is taught using the defined macros, supplemented by keystroke instructions when appropriately defined macros are not available.

While the invention has been illustrated in some detail according to the preferred embodiment shown in the accompanying drawings, and while the preferred embodiment has been described in some detail, there is no intention to thus limit the invention to such detail. On the contrary, it is intended to cover all modifications, alterations and equivalents falling within the spirit and scope of the appended claims.

What is claimed is:

1. Apparatus for creating a cycle of operation program for a robot arm, the program including coordinates of locations to which the robot arm is to move a function element and function instructions associated with the locations, the program to be executed by a controller having a memory, the program being created by use of a pendant for defining the locations and storing the coordinates thereof in the memory and a teaching station independent of the pendant, the apparatus comprising:
    (a) first keystroke means associated with the teaching station for storing in the memory a macro including a sequence of instructions identified by a predetermined macro identifying keystroke; and
    (b) second keystroke means associated with the pendant for effecting the identifying keystroke to cause the macro sequence of instructions to be stored in association with a selected location.

2. Apparatus according to claim 7 further comprising macro control means enabled by said macro enabling means for inserting in said macro, commands not intended for incorporation in said program but operative upon selection of said macro to enable incorporation into said program of specified types of instructions from said first keystroke means.

3. Method of generating an operating control program for a robot arm comprising the steps of:
    operating a first keystroke means to generate a macro comprising a sequence of macro instructions defining a first operation to be performed by said arm,
    storing said macro in a memory,
    operating a servo drive to position the end of said arm at a series of desired points in space,
    generating a series of movement instructions directing said servo to move the end of said arm successively to said points,
    causing said movement instructions to become part of a cycle of operation program for said arm,
    retrieving said macro from said memory,
    causing said sequence of macro instructions to become part of said cycle of operation program at a position therein corresponding to a desired relative time of occurrence of said first operation,
    while said arm is at one of said desired points further operating said keystroke means to generate a sequence of keystroke instructions defining a second operation to be performed by said arm, and
    causing said sequence of keystroke instructions to become part of said cycle of operation program at a position therein corresponding to a desired relative time of occurrence.

4. A method for generating an operating control program for a robot arm, the program including coordinates of locations to which the robot arm is to move a function element and function instructions, the program to be executed by a controller having a memory, the program being generated by use of a pendant for defining locations and storing coordinates thereof in the memory and a teaching station independent of the pendant, the method comprising the steps of:
    (a) operating a first keystroke means associated with the teaching station to store a macro in the memory, the macro including a sequence of instructions identified by a predetermined identifying keystroke,
    (b) operating the pendant to place the function element at a desired location; and
    (c) operating a second keystroke means associated with the pendant to produce the identifying keystroke to cause the sequence of instructions to be stored in association with the desired location.

5. A method for creating a cycle of operation program for a computer controlled robot arm, the computer including a memory, the program being created by use of a pendant for manually directing the operation of the arm while under computer control and by use of a teaching station independent of the pendant, the method comprising the steps of:

(a) selecting a macro definition mode of operation of the computer from the teaching station;

(b) storing macro signals in the memory as selected from the teaching station, the macro signals including macro defining signals representing a macro identifying character and macro instruction signals representing a sequence of instructions:

(c) selecting a program generation mode of operation of the computer; and (d) selecting the macro defining signals from the pendant to effect the assembly of the macro sequence of instructions in the cycle of operation program.

* * * * *